J. S. DUFFY.
COTTON AND HAY PRESS.
No. 101,239. Patented Mar. 29, 1870.
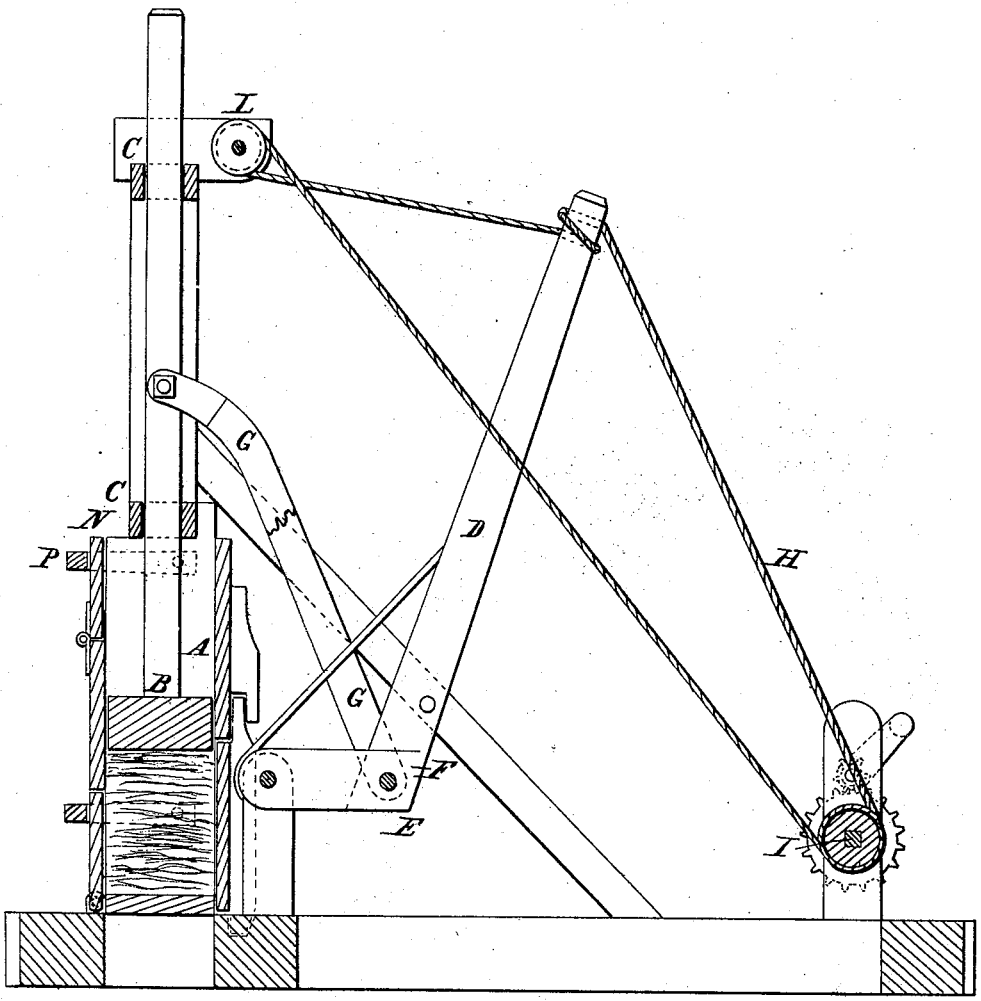
Witnesses:
E. Wolff
O. Hinchman
Inventor:
J. S. Duffy.
pr. Munn & Co
Attorneys.

United States Patent Office.

J. S. DUFFY, OF BATTLE GROUND, INDIANA.

Letters Patent No. 101,239, dated March 29, 1870.

IMPROVEMENT IN COTTON AND HAY-PRESSES.

The Schedule referred to in these Letters Patent and making part of the same.

*To all whom it may concern:*

Be it known that I, J. S. DUFFY, of Battle Ground, Tippecanoe county, Indiana, have invented a new and Improved Hay and Cotton-Press; and I do hereby declare that the following is a full, clear, and exact description thereof, which will enable others skilled in the art to make and use the same, reference being had to the accompanying drawing forming part of this specification.

This invention relates to improvement in presses for hay, cotton, and other similar articles, designed to provide an arrangement whereby a sufficient amount of power may be applied by hand and in a short space of time, and so arranged that the applied power will increase as the bale becomes more compact.

The drawing represents an elevation of my improved machine partly in section.

A represents the chamber in which the pressing is effected, and

B the follower, the stem of which works in vertical ways C.

D represents the operating-lever; it is provided with a knee at E, and pivoted to the stud F.

G represents bent connecting-rods jointed to the lever D at the knee E, and to the stem of the follower.

The end of the long arm of the lever is connected by a cord, H, working over a drum, I, actuated by reducing-gears, to give additional leverage in working the press.

To facilitate the raising of the lever D and the follower, the cord, H, is carried from the drum over a pulley, L, at the top of the frame, and united again to the end of the lever. By this arrangement the follower may be raised by turning the hand-crank in the direction opposite to that required for effecting the pressing.

The upper part of the pressing-case is provided with a door, N, opening downward, for supplying the material to be pressed.

P represents spring catches for holding it closed. A similar arrangement is provided at the bottom for discharging the bale.

By the employment of the knee-shaped lever the point of connection of the arms, A, with the same is carried more nearly to the line of draft from the stem of the follower through the fulcrum of the lever D, as the latter is moved downward and an increase of leverage in favor of the power ensues as the bale becomes more compact, and presents greater resistance.

This advantage renders the machine capable of being operated by hand with great facility.

I disclaim the arrangement of operating parts with the pressure-lever, or supplementary follower, C, and follower P, as shown in the rejected case of P. H. Stevens, but What I do claim is—

An improved arrangement of parts, dispensing with such pressure lever, and consisting of the press-box, A, provided with its hinged-door and spring catch at top and bottom, follower B, guides C C, angle-lever D, lifting-strap G, cord H, pulley L, and drum I, when these parts are constructed and arranged together as herein shown and described.

The above specification of my invention signed by me this 30th day of December, 1868.

J. S. DUFFY.

Witnesses:
 WM. MOTE,
 WM. STRIGLY.